UNITED STATES PATENT OFFICE.

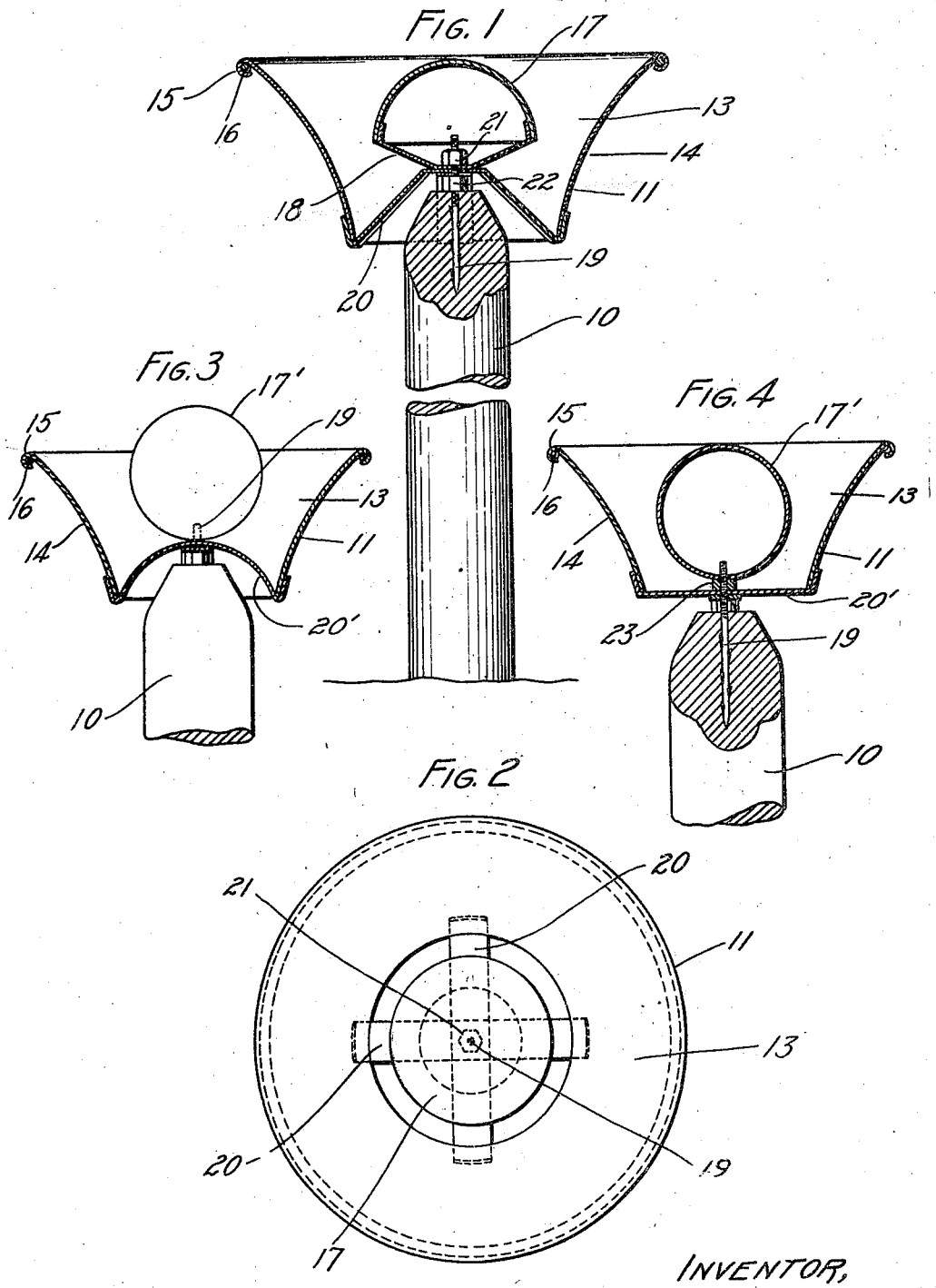

EDWARD S. WHITEHEAD, OF HOLLYWOOD, CALIFORNIA.

UNIVERSAL SOLAR REFLECTOR.

1,201,536.  Specification of Letters Patent.  Patented Oct. 17, 1916.

Application filed January 14, 1916. Serial No. 72,042.

*To all whom it may concern:*

Be it known that I, EDWARD S. WHITEHEAD, a citizen of the United States, residing at Hollywood, in the county of Los Angeles and State of California, have invented new and useful Improvements in Universal Solar Reflectors, of which the following is a specification.

My invention relates to a universal solar reflector and has for its object to construct a solar reflector which will reflect the rays of the sun radially upward therefrom.

Another object of this invention is to devise a solar reflector which will reflect the light of the sun for all positions of the latter during the day.

Another object is to construct a solar reflector, simple of construction, positive in operation, and inexpensive of manufacture.

My universal solar reflector is capable of many applications. It is especially useful for keeping birds off fruit trees. It is a common expedient at the present time to suspend glittering objects such as tin and the like, in the branches of a tree for keeping birds away. Such devices are ineffective except when the reflected solar rays strike the eyes of the birds.

My improved reflector causes a dazzling glare to strike the eyes of the birds approaching the reflector during any time of the day during which the sun shines.

Another application of my device is for protecting domestic fowls from chicken hawks and other birds of prey. It is well known that chicken hawks seldom molest fowls on cloudy days, their depredations occurring usually during the hours of 8 a. m. and 4 p. m. My solar reflector will effectively protect the fowls from their attacks by reason of the fact that the birds of prey are met by a blinding reflection of the sun, preventing their seeing any object in the vicinity of the reflector.

Another use of my invention is to provide land marks for aviators. A series of my reflectors may be arranged in a suitable manner which will be visible on sunny days to the aviator, even at the greatest heights. For instance, one station may be equipped with three reflectors arranged in the shape of a triangle, another with four reflectors in the shape of a square, and so on.

With the above and other objects in view which will appear as the description proceeds, my invention consists in the construction and combination of parts hereinafter described and claimed.

In the accompanying drawings which form a part of this specification, I have illustrated a practical and convenient embodiment of my invention, and in which:

Figure 1 is a vertical cross section of my device, mounted on the top of an upright. Fig. 2 is a top plan view thereof. Fig. 3 is a modification of my invention. Fig. 4 is another modification thereof.

On an upright 10, a lateral reflecting member 11 of the general shape of an inverted truncated tubular cone is secured. The same consists of a sheet of metal and has a highly polished inner face 13 to reflect the light, and a non-reflecting outer face 14. The upper edge of the lateral reflecting member 11 is turned outwardly upon itself to form a tubular ring 15 in which a circular rod 16 is positioned, which serves to give strength and rigidity to the said reflecting member. A semi-spherical reflector 17 consisting of a sheet of metal highly polished on the outside is centrally located within the lateral reflector 11, the top of said spherical reflector 17 being level or slightly below the upper edge of the lateral reflector 11. A base member 18 suitably secured to the lower edge of the spherical reflector 17 is secured to the upright 10 by means of a bolt 19. A pair of straps 20 suitably secured to the lower edge of the lateral reflector 11 and extending at right angles to each other are likewise secured to the upright 10 by means of the bolt 19, said bolt passing through the base 18 and straps 20. Nuts 21 and 22 on said bolt on opposite sides of said straps and base member, securely hold the reflectors in position in relation to the upright 10 and to each other.

In Fig. 3 I have shown a similar solar reflector as shown in Fig. 1, except that the spherical reflector 17' is a perfect sphere having its upper portion extending above the upper rim or edge of the lateral reflector 11. The reflector 17' is mounted directly on the bolt 19.

In Fig. 4, a reflector similar to the one shown in Fig. 3 is illustrated. In this modification, the reflector 17' is directly mounted on bolt 19 and a spacing nut 23 is provided between the bottom of said reflector and the straps 20'. It differs also from the modification shown in Fig. 3, in the position of the spherical reflector, whose top is level with the upper edge of the lateral reflector 11.

I prefer to make the wall of the lateral reflector concave toward the outside, though it will be understood that the wall may be the surface of a true cone.

From the foregoing description, the operation of my device will be easily understood. The rays of the sun shining upon the reflector will be reflected radially to all points above said reflector. The lateral reflector 11 serves as a shield or screen, preventing any light rays from being reflected downwardly. The polished inner side 13 of the lateral reflector 11 increases the effectiveness of the central reflector 17 by reflecting the sunlight to the latter, from which in turn it is reflected upwardly. It should be noted that the lateral reflector 11 is open at the bottom, thereby preventing rain, water, or snow, or any other objects, such as leaves to accumulate therein.

I do not confine myself to the specific construction of the reflector, as described, as various changes may be made by those skilled in the art without departing from the spirit of my invention as claimed.

I claim:

1. A universal solar reflector comprising a support, a tubular lateral reflector having the shape of an inverted truncated cone with concave lateral walls, said reflector being made of metal and provided with a polished inner face and a non-reflecting outer face, a spherical reflector made of polished metal, mounted within said lateral reflector and in spaced relation thereto, the top of said spherical reflector being level with, or below the upper edge of said lateral reflector and fastening means securing said reflectors to the upper end of said support.

2. A universal solar reflector comprising a support, a tubular lateral reflector having the shape of an inverted truncated cone, said lateral reflector being made of metal and provided with a polished inner face and a non-reflecting outer face, a spherical reflector made of polished metal mounted within said lateral reflector and in spaced relation thereto, the top of said spherical reflector being level with, or below the upper edge of said lateral reflector and fastening means securing said reflectors to the upper end of said support.

3. A universal solar reflector comprising a support, a tubular lateral reflector having the shape of an inverted cone, said reflector being provided with a light reflecting inner face and a non-reflecting outer face, a spherical reflector mounted within said lateral reflector and in spaced relation thereto, and fastening means securing said reflectors to the upper end of said support.

4. A universal solar reflector comprising a lateral reflector having the shape of an inverted cone, said reflector having a light reflecting inner face and a non-reflecting outer face, and a spherical reflector within said lateral reflector and means connecting said reflectors in spaced relation to each other.

5. A universal solar reflector comprising a lateral tubular shield, and a spherical reflector mounted within said shield in spaced relation thereto.

In testimony whereof I have signed my name to this specification.

EDWARD S. WHITEHEAD